United States Patent [19]

Schwenninger

[11] 3,918,949

[45] Nov. 11, 1975

[54] METHOD AND APPARATUS FOR PREVENTING EROSION OF A GLASS FURNACE BASIN WALL

[75] Inventor: Ronald L. Schwenninger, Cumberland, Md.

[73] Assignee: PPG Industries, Inc., Pittsburgh, Pa.

[22] Filed: July 10, 1974

[21] Appl. No.: 487,324

[52] U.S. Cl. .................. 65/26; 65/137; 65/337; 65/355
[51] Int. Cl.² ............................................. C03B 5/22
[58] Field of Search ............... 65/137, 26, 337, 355

[56] References Cited
FOREIGN PATENTS OR APPLICATIONS

| | | | |
|---|---|---|---|
| 327,868 | 4/1930 | United Kingdom | 65/137 |
| 1,922,258 | 4/1969 | Germany | 65/355 |

*Primary Examiner*—Arthur D. Kellogg
*Attorney, Agent, or Firm*—Donald Carl Lepiane

[57] ABSTRACT

Disclosed is a method of preventing erosion of glass furnace basin walls. A plurality of pipes are submerged in molten glass adjacent the basin wall and spaced therefrom. Submerging the pipes prevents chemical deterioration of the pipes. A cooling medium, e.g. water, is moved through each of the pipes to extract about 24,500 BTUs per linear foot of pipe to cool the glass in contact with the pipes. The cooling pipes prevent erosion of the glass furnace basin walls by (1) cooling the glass to form a protective layer of devitrified glass and molten glass of high viscosity about the pipes which maintains the molten glass in spaced relation to the basin walls and (2) lowering the temperature of the glass-refractory interface located below and beyond the area of the protective layer.

6 Claims, 5 Drawing Figures

METHOD AND APPARATUS FOR PREVENTING EROSION OF A GLASS FURNACE BASIN WALL

BACKGROUND OF THE INVENTION

1. Field of the Invention

This invention relates to a glass furnace and more particularly to a method of preventing erosion of the basin walls of a melting section of a glass furnace.

2. Discussion of the Technical Problems and the Prior Art

Glass is normally manufactured on a continuous basis in a glass furnace. In general, glassmaking ingredients are fed into one end of a melting section of the furnace where heat is applied to melt the ingredients to form a molten pool of glass. A portion of the molten pool of glass moves downstream into a refining section of the furnace as portions of the refined glass are continuously removed from the refining section.

In the melter, high temperatures to melt the glass are normally maintained by directing heat across the glassmaking ingredients and the subsequently formed molten pool of glass. This heating procedure sets up convection currents in the molten pool of glass which move along a circuitous path. In general, the direction of the circuitous path is outward at the surface from the center of the molten glass toward the tank walls, downward toward the bottom of the tank, outward from the tank walls toward the center of the tank and then upward toward the surface of the molten pool of glass. The walls of the furnace which are normally made of a refractory material are gradually eroded by the molten glass as it moves along the circuitous path.

It has been recognized in the prior art that the erosion rate of the tank walls may be reduced or eliminated if the walls are cooled at the glass line or glass surface. This is because the molten glass coming into immediate contact with the cooled walls is cooled which increases the glass viscosity or devitrifies the glass adjacent the cooled walls. An increase in the viscosity of the glass retards the flow of glass downward upon the surface of the walls to reduce or eliminate the rate of erosion of the walls.

Disclosed in U.S. Pat. No. 2,077,705 is a glass tank wall that has a plurality of vertical slots that extend from the outer surface of the wall inward. Cooling streams of air are moved into the slots at their upper ends and substantially at the level of the glass line within the tank. The streams of air flow downward and escape at the lower ends of the slots. The cooling streams of air establish a condition of cooling on the glass in immediate contact with the walls to increase the viscosity of the glass at the glass line to reduce basin wall erosion.

Although practicing the teachings of the above-identified patent tend to reduce the erosion of the basin wall, there are limitations. For example, special type of brick has to be used to provide the slots for moving the cooling streams of air therethrough. This increases the cost of the glass furnace construction. Further, if a portion of the basin wall erodes at a faster rate than the remaining portions, the alternatives are to reduce the level of the bath below the erosion level or replace the wall. Both of the alternatives are expensive because the glass output of the furnace is substantially reduced. Further, cooling glass through a refractory wall is very inefficient because the refractory walls are poor thermal conductors.

Disclosed in U.S. Pat. No. 704,040 there is still another method of reducing basin wall erosion. In this instance, cooling pipes are positioned adjacent the outer surface of the basin walls at the glass line. As the basin wall erodes, the effect of the cooling pipes increases until the glass is cooled sufficiently to adhere to the basin wall at the glass line.

Although practicing the teachings of the above-identified patent minimize basin wall erosion, there are limitations. More particularly, a portion of the basin wall erodes prior to the glass cooling sufficient to stop erosion of the basin wall. That portion of the basin wall that has eroded is mixed in the molten glass. As can be appreciated by those skilled in the art, the refractory material in the glass causes stones, ream or gaseous inclusions, e.g., bubbles or seeds which reduce the optical quality of the glass subsequently formed. Further, cooling molten glass through a refractory wall by way of cooling pipes is very inefficient. This is because (1) refractory walls are poor thermal conductors and (2) a boundary condition exists between the refractory surface and pipe surface which retards the extraction of heat from the molten glass.

It would be advantageous, therefore, if a method of reducing basin wall erosion was available that did not have the drawbacks of the prior art.

SUMMARY OF THE INVENTION

This invention relates to a method of preventing erosion of basin walls of the furnace used for melting glassmaking ingredients to form a molten pool of glass. Facilities for extracting heat are submerged in the molten glass in spaced relation to the basin wall. Heat is extracted by way of the heat extracting facilities, e.g., about at least 24,000 BTUs per hour per linear foot of heat extracting facilities to provide a protective layer on the heat extracting facilities. The protective layer includes devitrified glass adjacent the heat extracting facilities and glass of high viscosity in the cooling area. The protective layer extends to the glass surface to maintain the molten glass at the glass surface in spaced relation to the basin walls to prevent erosion of the basin walls. The protective layer also prevents chemical deterioration of the pipe in the furnace.

Further the invention contemplates the practice of the invention in glass manufacturing methods using a glass melting furnace including a melting section having a pair of spaced basin walls and a refining section. The glass manufacturing method includes the steps of moving glassmaking ingredients into the melting section of the furnace, heating the glassmaking ingredients to provide a mass of molten glass, flowing a portion of the mass of molten glass from the melting section to the refining section, refining the mass of molten glass in the refining section and removing a portion of the refined mass of glass from the refining section. The improvement includes the steps of submerging facilities for extracting heat in spaced relation to at least a portion of the basin walls of the melting section and extracting heat from the molten pool of glass by way of the heat extracting facilities to provide the protective layer about the heat extracting facilities and extending to the glass line.

The invention also contemplates a glass melting furnace of the type having a melting section including basin walls wherein glassmaking ingredients can be melted to form a mass of molten glass. The improvement includes heat extracting facilities submerged in the molten glass adjacent the basin walls to extract heat from the mass of molten glass adjacent the basin walls. Extracting heat, e.g., about 24,000 BTUs per hour per linear foot of the heat extracting means provides the protective layer about the heat extracting facilities which extend to the glass surface. The heat extracting facilities may be a plurality of cooling pipes submerged below the glass line along the basin walls of the melting section.

The invention also contemplates a flat glass furnace of the type including a melting section for melting glassmaking ingredients to provide a molten pool of glass and a refining section for refining molten glass. A portion of the molten glass from the melting section moves into the refining section and is extracted therefrom on a continuous basis. The improvement includes heat extracting means submerged adjacent the basin walls of the melting section and to extract heat from the mass of molten glass adjacent the basin walls to provide the protective layer.

DESCRIPTION OF THE INVENTION

Figure 5:
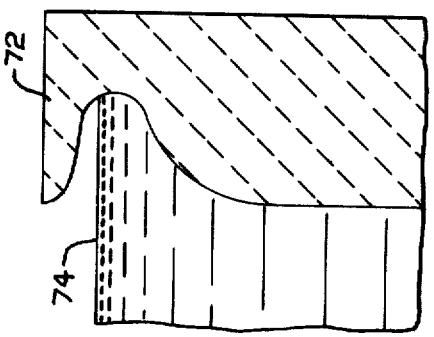
FIG. 5 is a fragmented cross-sectional view of a prior art basin wall showing the erosion pattern after 1 year of use.

This invention is an improvement on glassmaking furnaces to prevent erosion of the basin walls. In general, and with reference to FIG. 1, glass furnace 10 includes a bottom 12, basin sidewalls 14 (shown better in FIG. 2), basin back wall 16, basin front wall 18, and crown 20. The furnace 10 is divided into a melting section 22, and a refining or conditioning section 24 by a drop arch 26 which extends downward from the crown 20.

The basin front wall 18 of the furnace 10 is connected to a glass forming chamber 28 by way of a delivery channel 30. The forming chamber 28 may be a float bath of the type used in the manufacture of flat glass or a draw chamber of the type used in the manufacture of sheet glass.

Figure 1:
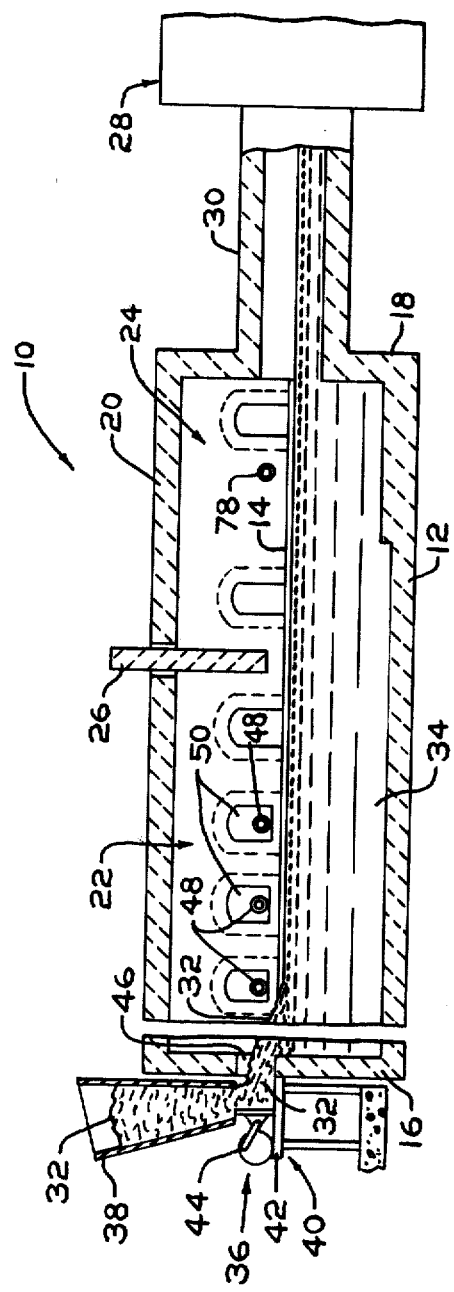
FIG. 1 is a side elevated view of a glassmaking furnace having portions removed for purposes of clarity.

With continued reference to FIG. 1, raw batch materials 32 such as the type used in making glass are fed through the basin back wall 16 on a continuous schedule. The batch materials are melted in the melting section 22 to form a molten pool of glass 34. A portion of the molten glass moves downstream into the refining section 24 where the molten glass is refined. Thereafter, portions of the refined glass move downstream to the delivery channel 30 where the refined glass is removed on a continuous basis.

The raw batch materials may be fed with a batch feeder 36 of the type known in the art. The batch feeder 36 for example can include a hopper 38 into which the raw batch materials 32 are regularly charged. The hopper 38 is positioned above a batch feeder mechanism 40 which may be a shelf 42 in combination with a pusher 44 for pushing the raw batch materials 32 into the melting section through an opening 46 above the back basin wall 16. As seen in FIG. 1, the batch materials flow on the molten glass 34 within the melter until the raw batch materials are melted to form glass.

The raw batch materials are melted in the melter in any conventional manner. For example, a gas or oil burner pipe 48 may be provided in ports 50 and extend into the head space above the molten glass 34 to direct a flame over the molten glass. Combustion air is supplied to the head space above the molten glass 34 through the ports 50 about the burner pipes 48 in any conventional manner.

Figure 3:
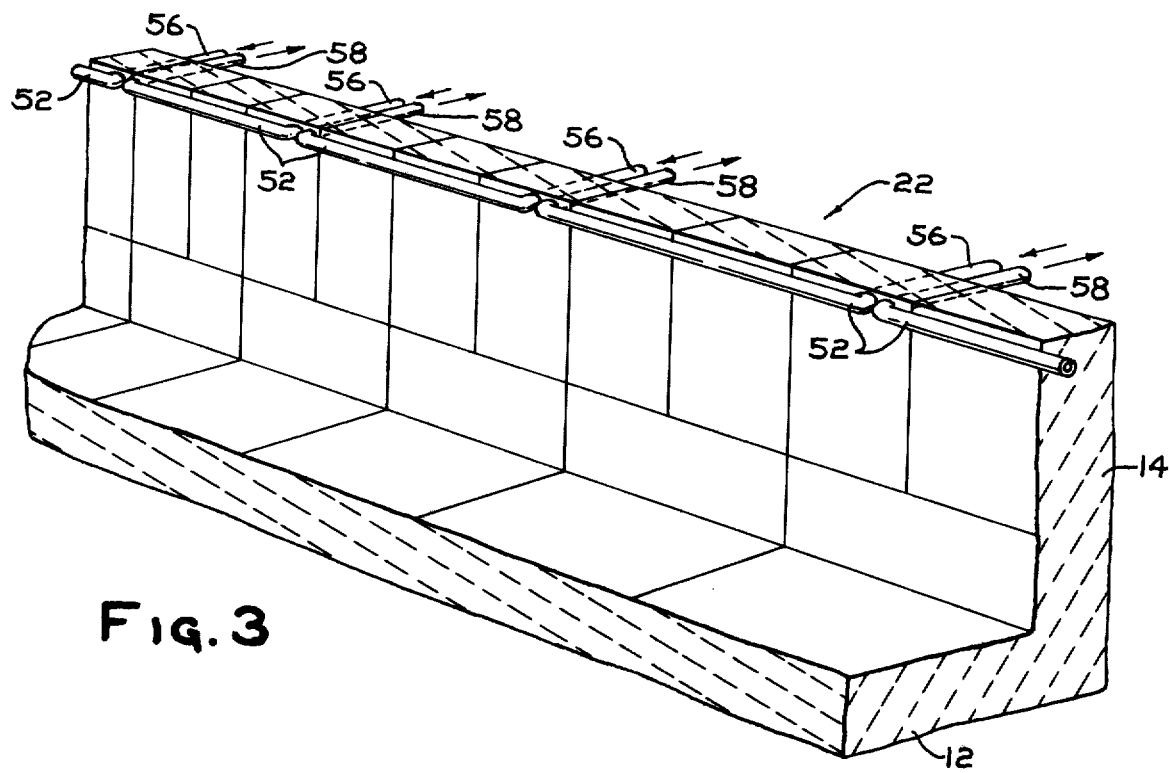
FIG. 3 is a fragmented isometric view of the melting section of the furnace of FIG. 1 having portions removed for purposes of clarity to illustrate cooling pipes mounted in the basin wall in accordance to the teachings of the invention.
Figure 2:
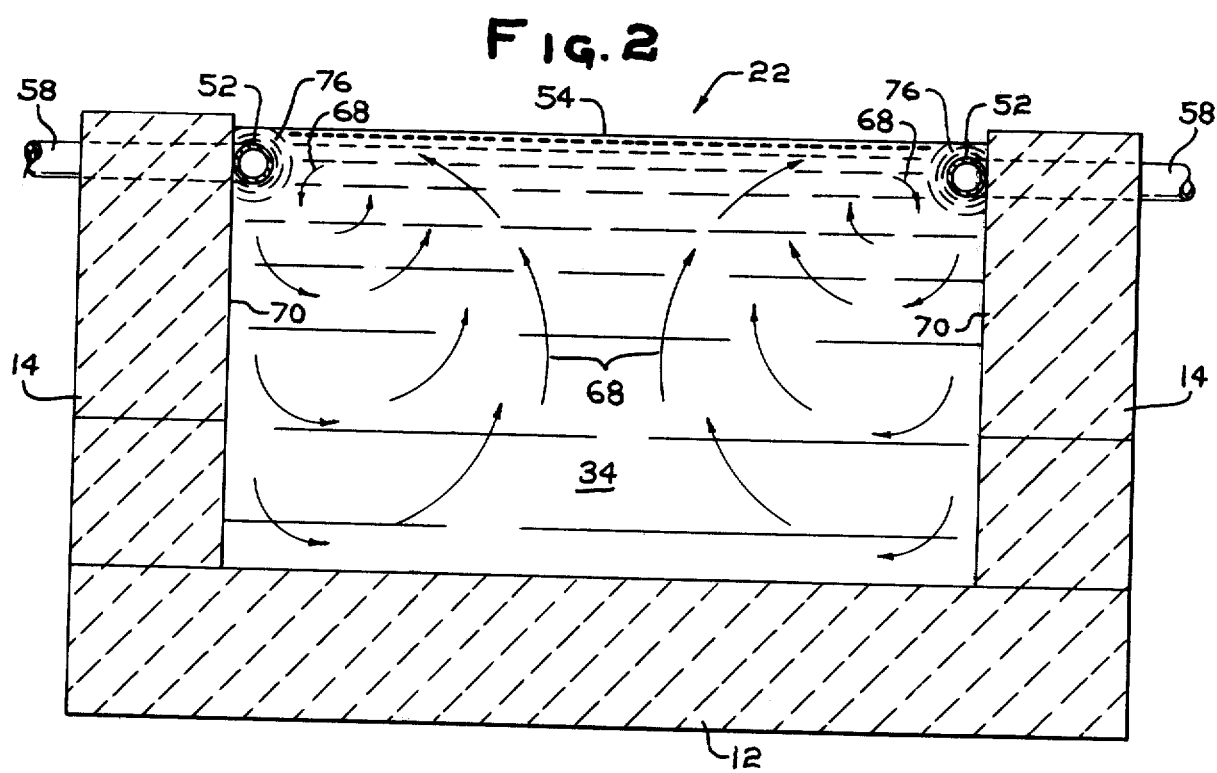
FIG. 2 is a front cross-sectional view of melting section of the furnace of FIG. 1 having portions removed for purposes of clarity.

With reference to FIGS. 2 and 3, there is shown a plurality of pipes 52 preferably mounted in the basin sidewalls 14 below the glass line or glass surface 54 having their inlet end 56 and outlet end 58 extending through the basin walls 14 to provide access for moving a cooling fluid through the pipes.

Figure 4:
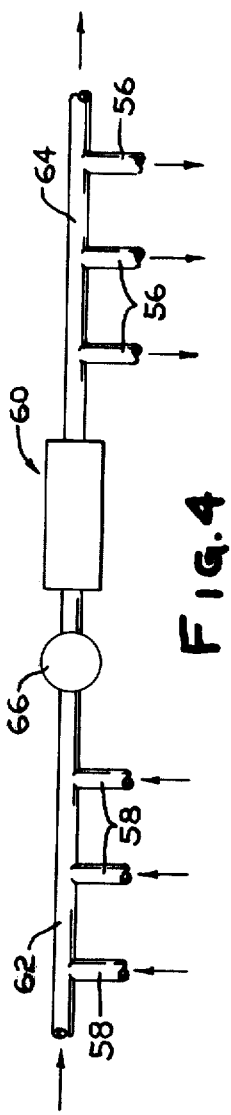
FIG. 4 is a block diagram of a water recirculating system that may be used in the practice of the invention.

With reference to FIG. 4, the inlet end 56 of each of the pipes 52 is connected to a heat exchange 60 by way of an inlet manifold 62 and the outlet end 58 of each pipe is connected to the heat exchanger 60 by an outlet manifold 64. A pump 66 is provided on the inlet manifold 62 or outlet manifold 64 to move a cooling medium, e.g., water, from the heat exchanger to the inlet end of each of the pipes, through the pipes to the outlet end and then to the heat exchanger.

With specific reference to FIG. 2, as the glassmaking ingredients are melted in the melting section, current paths 68 are set up in the molten pool of glass. The current paths which are pertinent to the present invention are those which erode the basin wall at the glass surface 54. These currents approach the basin wall near the glass surface 54 and move downward adjacent the basin wall. The distance downward from the surface of the glass is a function of the distance from the basin wall. As the distance from the basin wall increases, the depth of the current decreases. The currents move away from the basin wall toward the center of the tank and upward toward the surface.

As the glass moves along the current paths 68, the basin wall is eroded at the glass refractory interface. It is believed that the erosion is a chemical and physical reaction. More particularly, the glass in contact with the basin wall erodes the basin wall in direct proportion to the velocity of convection and in direct proportion to the temperature at the interface 70 between the glass and basin wall. Temperature and convection are maximum at the glass line and it is in this area that the erosion is most pronounced. With reference to FIG. 5, there is shown a cross-section of a basin wall 72 of a prior art furnace. After 1 year of operation, 75 percent of the thickness has been eroded at the glass surface 74.

With reference to FIG. 2, to prevent erosion of the basin wall, the plurality of cooling pipes 52 are submerged below the glass surface 54 adjacent the basin wall. As the molten glass moves along the current paths 68 past the cooling pipes, the glass is cooled which increases the viscosity of the glass. The glass in contact with the pipes devitrifies and adheres to the pipes to form a protective layer 76 of devitrified glass and glass having high viscosity. The protective layer 76 covers the pipe and extends upward toward the glass line 54. The glass in contact with the pipe is devitrified glass and the glass immediately adjacent to the devitrified glass has increased viscosity which retards the velocity of the glass adjacent to the basin wall in the area of the cooling effect of the pipe. This layer (1) protects the pipe against erosion by the glass and (2) prevents the molten glass as it moves along the current paths from eroding the basin wall at the glass line or glass surface 54.

In addition to eliminating or retarding erosion of the basin wall at the glass line, the cooling pipes also retard erosion of the basin wall below the cooling pipes by locally reducing glass temperature which decreases glass velocity and retards chemical corrosion rates.

The thickness of the protective layer 76 depends on (1) the amount of heat extracted from the surrounding area by the cooling pipes; (2) the diameter of the cooling pipes; (3) the convection velocity of the glass in the vicinity of the pipe along the current paths 68 and (4) the temperature of the glass in the vicinity of the pipes. For a constant (1) amount of heat extracted by the pipes; (2) pipe diameter; and (3) glass velocity, increasing the temperature of the glass decreases the thickness of the protective layer. For a constant (1) temperature of the glass; (2) pipe diameter; and (3) glass velocity, increasing the amount of heat extracted increases the thickness of the protective layer. For a constant (1) temperature of the glass; (2) pipe diameter; and (3) heat extraction by the pipes, increasing the glass velocity decreases the thickness of the protective layer. For a constant (1) temperature of the glass; (2) glass velocity and (3) amount of heat extracted by the pipes, increasing the diameter of the pipes decreases the thickness of the protective layer.

In general, the temperature and convection velocity for molten glass are normally contant, therefore, it can be stated that the protective layer 76 is a function of heat extracted and pipe diameter. It has been found that at least 24,000 BTUs per hour per linear foot of standard 1 ½ inch (4.2 centimeters) cooling pipe made of mild steel, e.g., black iron pipe, provides a protective layer of from ½ –1 ½ inches (1.3 to 3.8 centimeters). As can be appreciated, the upper limit of heat extracted is limited only by economic considerations.

In general, the amount of heat extracted by the cooling pipes depends on the following parameters: (1) heat absorption quality of the cooling medium; (2) heat transfer of the material of the cooling pipes; (3) pressure of the cooling medium flowing through the pipes; (4) flow rate of the cooling medium through the pipes. As the heat absorbing quality of the cooling medium increases while maintaining the other parameters constant, the amount of heat extracted from the molten glass by the cooling pipes increases. As the heat transfer quality of the material increases, while maintaining the remaining parameters constant, the amount of heat extracted from the molten glass by the cooling pipes increases. As the pressure of the cooling medium moving through the pipe increases, while maintaining the remaining parameters constant, the amount of heat extracted from the molten glass by the cooling pipes increases.

In general, it has been found that water at a temperature of 80°–100°F. passing through a steel pipe having an outside diameter (O.D.) of 2 inches (5.08 centimeters) and inside diameter (I.D.) of 1.6 inches (3.06 centimeters) under pressure of 40 pounds per square inch (psi) (92 feet of water) at a flow rate of 5 gallons per minute per linear foot (6.3 liters per minute per linear meter) extracts about 24,000–25,000 BTUs per hour per linear foot. Extracting about 24,000–25,000 BTUs per hour per linear foot provides a protective layer 76 of about 1 ½ inches to 2 ½ inches (3.8 to 6.4 centimeters) about the pipe with the thicker layer between the pipe and basin wall.

As can be appreciated by those skilled in the glassmaking art, the material of the pipes should be compatible with molten glass. More particularly the material should not contaminate the molten glass to effect the quality of the glass subsequently formed. Further, as can be appreciated, the invention is not limited to the number of pipes or the length of the pipes provided along the basin wall below the glass line 54. However, it has been found that using one pipe extending along the wall has limitations. For example, as the length of the pipe increases, the water temperature increases with the direction of flow. This increases the risk of steam pockets and subsequent failure of the pipes. It has been found that pipes of approximately 5–10 feet (1.5 to 3 meters) in length are acceptable. Still further, as can now be appreciated by those skilled in the art, the cross-sectional shape of the basin wall is not limited. For example, the invention can be practiced on basin walls having uniform thickness or on basin walls having an inward sloping surface adjacent the glass surface or glass line 54.

As previously mentioned, a portion of the molten glass moves downstream from the melting section into the refining section. With reference to FIG. 1, in the refining section 24, the molten glass is maintained at a predetermined temperature by burners 78. Normally, the temperature of the glass and the convection velocity of the glass in the refining section is sufficiently low that the erosion of the basin walls in the refiner section is not a problem.

Constructing glass furnaces according to the teachings of the invention increases the campaign life of the glass furnace. This is because the glass which normally erodes the basin wall at the glass line is eliminated. It is eliminated by the cooling pipes submerged in the molten glass which forms a protective layer of devitrified glass and glass of high viscosity which extends toward the glass line to maintain the molten pool of glass in spaced relationship to the basin walls and decreases the velocity of the glass as it moves along the current paths.

Practicing the instant invention has advantages over the prior art methods of preventing erosion of the basin walls. More particularly, in the prior art it is taught that glass as the glass line can be cooled by moving cooling air through slots formed in the brick. The disadvantages of this method are the increased cost of basin wall refractories to provide the slots and the action necessary if the refractories erode at the glass line and molten glass flows through the slots. More particularly, if a brick erodes, it is necessary to (1) either lower the glass line or (2) replace the brick wall which reduces the output of the furnace. In the present invention, the pipe is protected with devitrified glass and should not wear, e.g. deteriorate due to the chemical atmosphere and/or molten glass.

Also in the prior art, it is taught that the glass line can be maintained away from the basin wall by providing pipes within the walls to cool the glass. The basin wall erodes until the effect of the cooling pipes is such that devitrified glass forms on the basin wall. This method has drawbacks in that the glass becomes contaminated with the refractory material. Practicing the present invention, there is virtually no erosion of the basin wall thereby preventing contamination of the molten glass.

DETAILED DESCRIPTION OF THE INVENTION

With reference to FIG. 1, the invention will now be used on a glass furnace 10 having a basin floor 12 which is 60 feet (50 meters) in length and 30 feet (9 meters) in width; basin walls 14 (shown in FIG. 2) which are 4 feet (1.2 meters) high and 160 feet (50 meters) in length; front and back walls 16 and 18, respectively, which are 14 feet (1.2 meters) high and 30 feet (9 meters) in length. The basin floor, basin walls, front wall and back wall are made or refractory brick of the type used in the glass making art, about 1 foot (.308 meters) thick. A drop arch 26 extends from crown 20 to a distance of about 7 feet (2.1 meters) from the basin floor 12 to provide a melting section 22, 90 feet (27 meters) by 30 feet (9 meters) and a refining section 24, 70 feet (21 meters) by 30 feet (9 meters). The front wall 18 is connected to a float forming chamber 28 by way of a delivery channel 30. The glass furnace has molten glass 34 approximately 1 inch (2.54 centimeters) below the top of the basin walls.

With reference to FIGS. 2 and 3, a plurality of standard 1 ½ inches (4.2 centimeters) cooling pipes 52 made of mild steel, e.g., black-iron pipe, approximately 5–7 feet (1.5–2.1 meters) in length are positioned along the basin wall at a distance of about 3 ½ inches (9 centimeters) from the top of the basin sidewalls 14 to the center of the pipe, e.g., the center of the pipe, is about 2 inches (5.0 centimeters) below the glass line 54. The pipes extend downstream from the back wall 16 a distance of about 100 feet (30 meters) starting 60 feet (18 meters) from the back wall 16.

With reference to FIG. 4, the inlet end 56 and outlet end 58 of each pipe extends through the basin walls and are connected to an inlet manifold 64 and outlet manifold 62, respectively. A pump 66 is mounted on the outlet manifold to move water through a heat exchanger 60 into the outlet manifold 64 at a flow rate of 5 gallons per minute per linear foot (6 liters per minute per linear meter) under pressure of 40 psi (92 feet of water). The temperature of the water at the inlet manifold is between 80°–100°F.

With reference to FIG. 1, glassmaking ingredients 32 such as the type known in the art are fed into opening 46 above the back wall 16 of the furnace by the batch feeder 32. More particularly, the glassmaking ingredients 32 are fed into a hopper 38 and are moved into the melting section through the opening 44 by a pusher 42 on a predetermined schedule.

The glassmaking ingredients 32 flow on the molten pool of glass 34 in the melting section 22 and are melted by combustion gases from pipes 48 and ports 50 in any conventional manner. As the glass-making ingredients flow along the molten glass, they are melted into molten glass. As the glassmaking ingredients are melted, a portion of the molten glass flows from the melting section 22 into the refining section 24 wherein the glass is refined and then out of the refining section 24 along delivery channel 30 to a float forming channel 28. The output of the furnace and feeding of the glassmaking ingredients are monitored to maintain the glass line 1 inch (2.54 centimeters) below the top of the basin walls.

With reference to FIG. 2, the molten glass in the melting section 22 moves along current paths 68 which extend from the center toward the basin walls, down the basin walls toward the basin floor, out from the basin walls toward the center of the molten glass and then up to the surface of the glass bath. As the glass moves past the cooling pipes 52, heat is extracted at the rate of about 24,500 BTUs per hour per linear foot of cooling pipe to form a protective layer 76 on the glass pipes which extends around the cooling pipes and up to the glass line 54. The protective layer includes devitrified glass around the pipes and molten glass of high viscosity surrounding the devitrified glass. This protective layer (1) protects the pipe against erosion by the glass and (2) prevents the molten glass as it moves along the current path from eroding the basin wall at the glass line or glass surface 54. In addition, the protective layer eliminates or retards erosion of the basin wall below the cooling pipes by locally reducing glass temperature which decreases glass velocity and retards chemical erosion rates.

What is claimed is:

1. A method of reducing the erosion of the side walls of the melting section of a glass melting furnace comprising a basin defined by a floor, side walls and front and back walls wherein glass making ingredients are melted to form a mass of molten glass which flows in said basin along the side walls thereof toward the back wall, said mass of molten glass having a surface which forms a flowing molten glass line near the top of said side walls, comprising conducting a cooling fluid medium in heat transferring relation to said molten glass through a region horizontally disposed throughout its entire length in said basin closely adjacent to and near the top of a side wall thereof and at a location at which erosion of the side walls normally occurs, and along inlet and outlet paths at each end of said region which are horizontally disposed and extend laterally through said adjacent basin side wall to provide an inlet and an outlet for the cooling fluid medium conducted through said region, said region and said laterally extending fluid inlet and outlet paths associated with said region each being entirely submerged in the mass of molten glass flowing in said basin and disposed a short distance below the glass line of said flowing mass of molten glass, and conducting said cooling fluid medium through said region and said inlet and outlet paths in an amount sufficient to build up a thick protective layer of devitrified glass around said region which extends from a location below said region to a location thereabove which is near the glass line of said flowing mass of molten glass and to provide thin, slow moving layers of highly viscous molten glass around said layer of devitrified glass which extend to the glass line of said flowing mass of molten glass.

2. The method as set forth in claim 1 wherein at least 24,000 BTUs per hour is extracted per linear foot of said horizontally disposed region in heat transferring relation to said cooling fluid medium.

3. The improved glass manufacturing method as set forth in claim 1 wherein the horizontally disposed region in heat transferring relation to said cooling fluid medium is submerged about ½–3 ½ inches below the glass line surface of the flowing molten glass.

4. In a glass melting furnace having a melting section comprising a basin defined by a floor, side walls and front and back walls wherein glass making ingredients are melted to form a mass of molten glass which flows in said basin along the side walls thereof toward the back wall, said mass of molten glass having a surface which forms a flowing molten glass line near the top of said side walls, at least one fluid-conducting pipe means horizontally disposed throughout its entire length in said basin closely adjacent to and near the top of a side wall thereof and at a location at which erosion of the side wall normally occurs, each said fluid-conducting pipe means being provided at each end thereof with horizontally disposed portions extending laterally through said adjacent basin side wall to provide an inlet and an outlet for fluid conducted by said fluid-conducting pipe means, said fluid-conducting pipe means and said laterally extending fluid inlet and outlet portions thereof each being entirely submerged in the mass of molten glass flowing in said basin and disposed a short distance below the glass line of said flowing mass of molten glass, and means for passing a fluid-cooling medium through said fluid-conducting pipe means and said inlet and outlet portions thereof in an amount sufficient to build up a thick protective layer of devitrified glass around said fluid-conducting pipe means which extends from a location below said pipe means to a location thereabove which is near the glass line of said flowing mass of molten glass and to provide thin, slow moving layers of highly viscous molten glass around said layer of devitrified glass which extend to the glass line of said flowing mass of molten glass.

5. The improved glassmaking apparatus as set forth in claim 4 wherein a plurality of said fluid-conducting pipe means are disposed throughout their entire length in said basin submerged below the glass line and having their ends extending through the basin side walls below the glass line.

6. The improved glass melting furnace of claim 4, wherein said horizontally disposed fluid conducting pipe means in said basin is submerged about ½ –3 ½ inches below the glass line surface of the flowing molten glass.

* * * * *